(No Model.)

3 Sheets—Sheet 1.

T. W. TYRER.
METHOD OF CONSTRUCTING BUILDINGS OF ARTIFICIAL STONE.

No. 292,149. Patented Jan. 15, 1884.

WITNESSES
Inventor:
Theodore W. Tyrer

Attorney (No Model.) 3 Sheets—Sheet 2.

T. W. TYRER.
METHOD OF CONSTRUCTING BUILDINGS OF ARTIFICIAL STONE.

No. 292,149. Patented Jan. 15, 1884.

(No Model.) 3 Sheets—Sheet 3.

T. W. TYRER.
METHOD OF CONSTRUCTING BUILDINGS OF ARTIFICIAL STONE.

No. 292,149. Patented Jan. 15, 1884.

United States Patent Office.

THEODORE W. TYRER, OF STILLWATER, MINNESOTA, ASSIGNOR TO SARAH P. TYRER, OF LOS ANGELES, CALIFORNIA.

METHOD OF CONSTRUCTING BUILDINGS OF ARTIFICIAL STONE.

SPECIFICATION forming part of Letters Patent No. 292,149, dated January 15, 1884.

Application filed June 14, 1883. (No model.)

*To all whom it may concern:*

Be it known that I, THEODORE W. TYRER, a citizen of the United States of America, residing at Stillwater, in the county of Washington and State of Minnesota, have invented certain new and useful Improvements in Method of Constructing Buildings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in buildings, its object being to construct a building the walls of which will be composed entirely of artificial stone, the blocks or pieces of stone being finished or molded in such shape as to provide an interior as well as an exterior finish, thus producing the internal ornamentation—as base-board, cornice, mantels, chimneys, &c.—as well as the exterior ornamentation, which will form an integral part of the building, whereby a building can be constructed which will be substantially fire-proof and will present a highly ornamental appearance.

Figure 1:
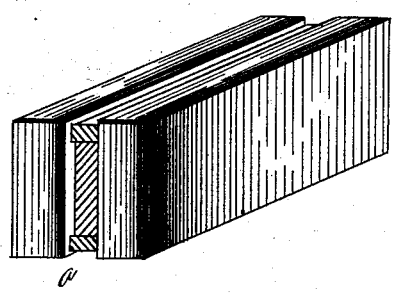
Figure 2:
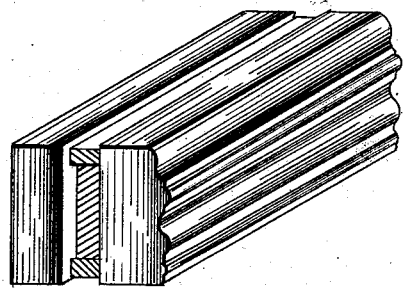
Figure 3:
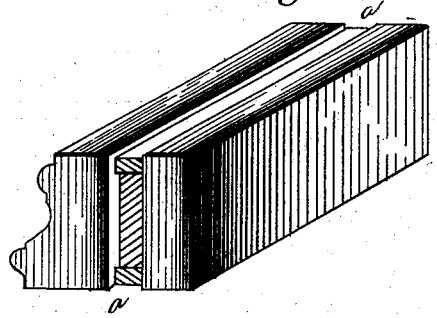
Figure 4:
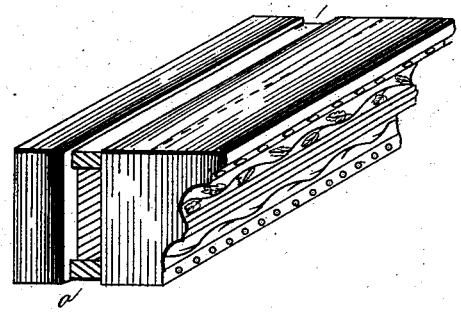
Figure 5:
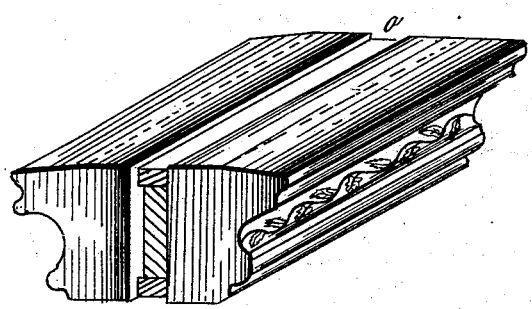
Figure 6:
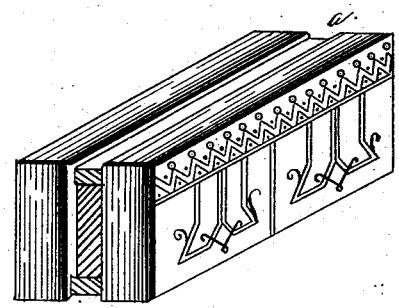
Figure 7:
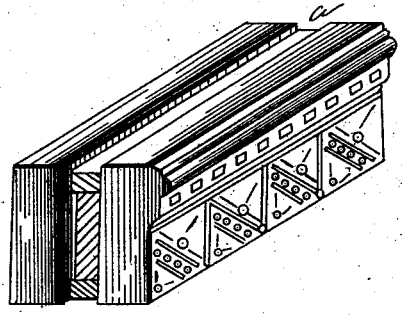
Figure 8:
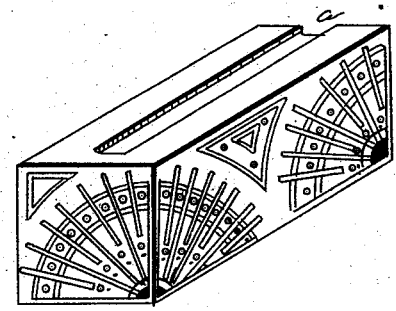
Figure 9:
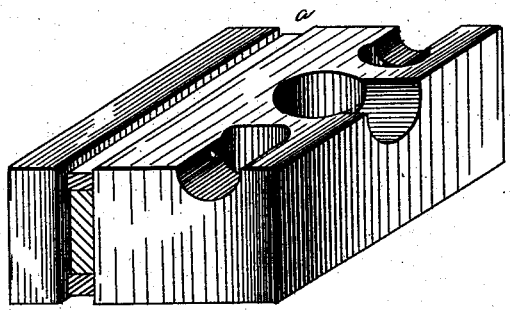
Figure 10:
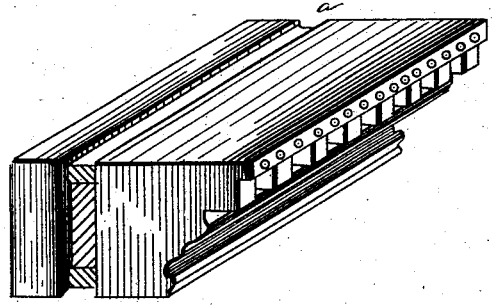
Figure 11:
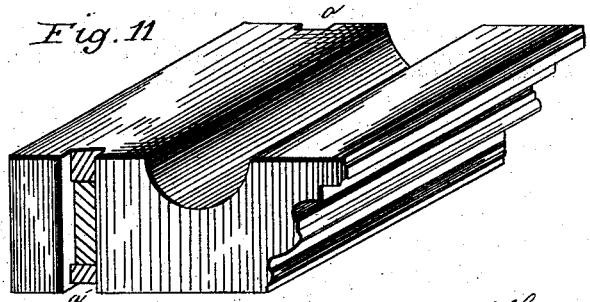
Figure 12:
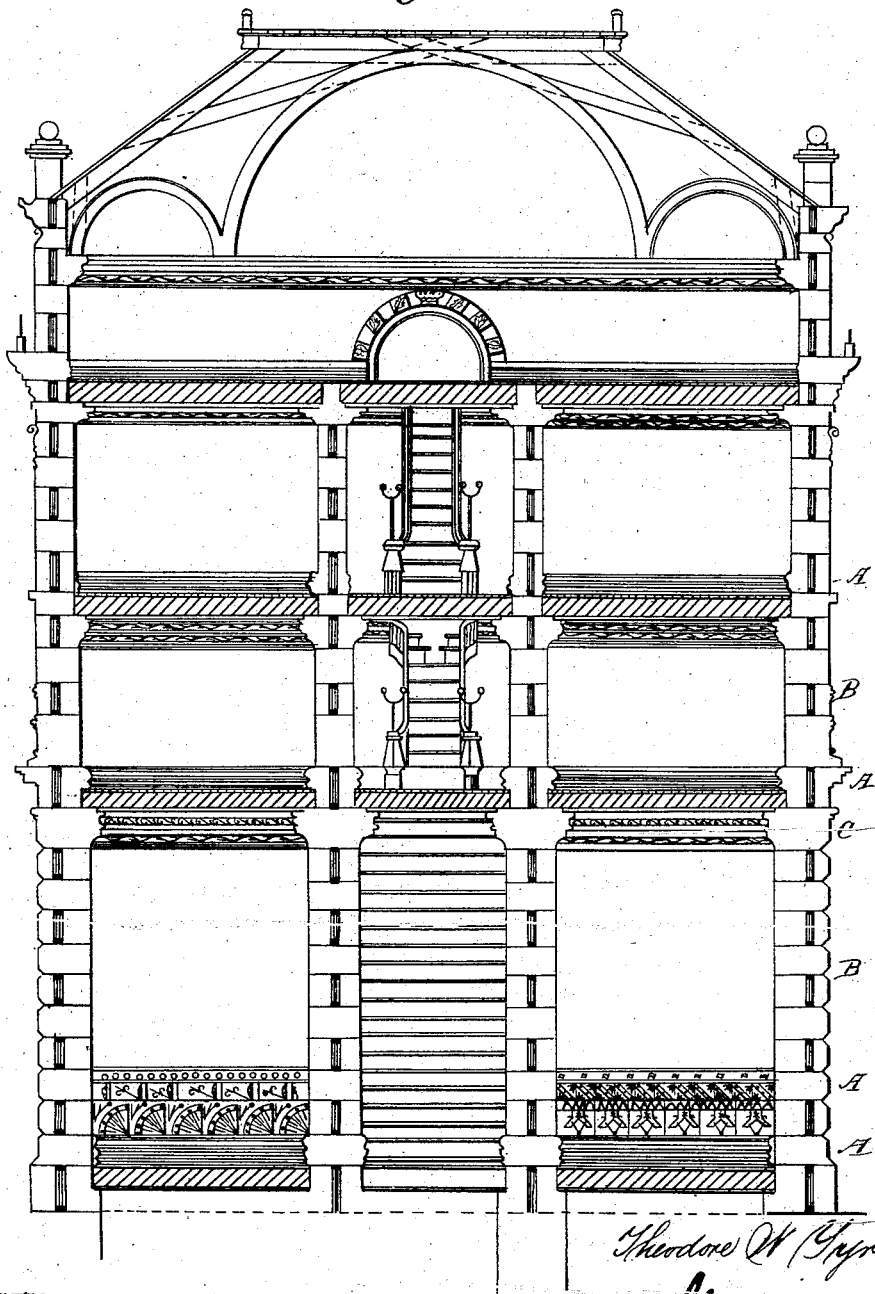

In the annexed drawings, which illustrate my invention, Figures 1, 2, 3, 4, 5, 6, 7, 8, 9, 10, and 11 are detailed perspective views, showing the configuration of the blocks forming the separate parts of the building; and Fig. 12 is a vertical section of a building constructed therefrom.

The blocks, as shown in Figs. 1 to 11, inclusive, are provided with both vertical and longitudinal grooves *a*, in which cement is placed for the purpose of uniting the stones to each other. These stones are provided with the desired ornamentation on their sides, which form the interior and exterior of the building, and the usual method of ornamenting the surface of artificial stone may be applied thereto.

It will be noticed, as shown in Fig. 12, that the walls decrease in thickness as they approach the top of the building, in which drawings A represents the stones which form the base-board, which is provided on its interior with suitable ornamentation. Above this board are the ordinary blocks which form the walls, as indicated by B, which may be plain on the exterior and ornamented on the interior, to represent wainscoting. Above these stones is laid a tier of plain blocks, which support the block C, which has formed thereon an exterior capital when used for business or public buildings, and on its inner surface projecting portion to represent a cornice the upper part of which supports the beams of the flooring of the story above. To the under portion of these beams is attached plaster, in the usual manner, by means of lath, and the stone that rests above the one hereinbefore mentioned, and indicated by the letter C, is provided with a frieze on its exterior and a base-board on its interior. The stones hereinbefore described are arranged in this manner until the roof is reached, after which the block, shaped as shown in Fig. 11, is applied, which stone forms a support for the water-shed of the roof and the gutter.

The stones hereinbefore described may be made hollow, so as to provide hot-air or heating tubes, ventilating-tubes, and chimneys.

The roof is composed of stones made rectangular in shape, laid upon a sheathing of matched lumber, over which is placed a coating of cement, in which the stones are placed.

In a building constructed in accordance with my invention there is less danger from fire, owing to the fact of the walls being constructed entirely of stone, without studding, furring, or lath, and all ornamental finish being of stone, there is no combustible material except the floors and doors, which have no connection with each other. Thus a fire originating in one room cannot communicate with the room adjoining or above, and, there being no wood-finishing, there can be but little danger of a fire kindling under any circumstances. Should a fire, however, originate in an upper story, and thus burn down all the floors, the walls will remain intact and unendangered, as the heat will not affect my artificial stone.

It will be also noticed that a building constructed in accordance with my plan will be very durable and will require but few repairs, as the stone is very hard and forms a finished wall without plaster.

The method of constructing buildings hereinbefore described provides for the most perfect means of ventilation, and is clean and free from dust, and has none of the pernicious effects that arise from plastered walls, and the walls are impervious to moisture, and are entirely proof against the depredations of rats, mice, and other vermin.

A building can be cheaply constructed in accordance with my plan, and, with the proper machinery, the walls are rapidly laid, and are finished when laid, and buildings can be constructed cheaply with an elaborate finish.

The chimneys or other ventilating means may be constructed as a part of the walls or independent thereof, as may be desired, and the partition-walls are connected to the outer walls by alternate T-shaped stones, grooved in the same manner as the regular stones which form the side walls.

If desirable, the interior finish—as banisters, mantel-pieces, arches, and paneling and verandas—may also be constructed of artificial stone and attached to a building, so as to form an integral part of the walls.

The artificial stone which I employ in the construction of this building may be of any of the approved kinds, preferably that known to the trade as "Egyptian."

I am aware that previous to my invention Letters Patent were granted to T. B. Rhodes, dated April 14, 1874, for an improvement in hollow building-blocks to be made of artificial stone, as described and shown in said Letters Patent, and I do not claim such construction as my invention; but

What I claim as new, and desire to secure by Letters Patent, is—

In a building, the walls consisting of blocks of artificial stone provided with interior and exterior decorations, and being united to each other by horizontal and vertical grooves filled with cement, said stones being ornamented on the interior so as to form base-boards, wainscoting, cornices, and other desired ornamentation, as described, and on the exterior portion to form cornices, brackets, friezes, capitals, and other ornamentation, the parts being arranged and organized substantially as shown, and for the purpose set forth.

In testimony whereof I affix my signature in presence of two witnesses.

THEODORE W. TYRER.

Witnesses:
S. E. THURSTON,
R. M. PARKER.